United States Patent [19]

Cory

[11] 4,247,060
[45] Jan. 27, 1981

[54] ATTITUDE RECOVERY DEVICE FOR HANG GLIDER

[76] Inventor: George J. Cory, 8235 SW. Ridgeway Dr., Portland, Oreg. 97225

[21] Appl. No.: 24,360

[22] Filed: Mar. 27, 1979

[51] Int. Cl.$^3$ .................. B64D 17/80; B64C 31/02
[52] U.S. Cl. ................................. 244/16; 244/139; 244/147; 244/75 R
[58] Field of Search .................. 244/DIG. 1, 16, 139, 244/147, 75 R

[56] References Cited

U.S. PATENT DOCUMENTS

| | | | |
|---|---|---|---|
| 1,076,803 | 10/1913 | Williams | 244/139 |
| 1,277,892 | 9/1918 | Evans | 244/139 |
| 1,296,736 | 3/1919 | Austin | 244/147 |
| 1,704,891 | 3/1929 | Hall et al. | 244/139 |
| 2,631,797 | 3/1953 | Smith | 244/139 |
| 3,936,012 | 2/1976 | Murray | 244/16 |

FOREIGN PATENT DOCUMENTS

| | | | |
|---|---|---|---|
| 2726453 | 7/1978 | Fed. Rep. of Germany | 244/DIG. 1 |
| 411227 | 6/1910 | France | 244/139 |
| 2337662 | 8/1977 | France | 244/DIG. 1 |
| 2978 | 12/1911 | United Kingdom | 244/139 |

*Primary Examiner*—Galen L. Barefoot
*Attorney, Agent, or Firm*—Townsend and Townsend

[57] ABSTRACT

A hang glider attitude recovery device that may be rapidly deployed with a minimum of pilot action comprises a drag element having an effective point of attachment rigidly spaced above the point from which the pilot is suspended, and a mechanism for activating the drag element at a point clear of upper structural members. The separation between the attachment point and suspension point provides a lever arm which is responsible for the operation of the device. When the hang glider is in a position where the lever arm is inclined from the vertical (hang glider out of attitude), activation of the drag element provides an upward force at the upper end of the lever arm, which force produces a moment that tends to bring the suspension point back into a position under the attachment point. In the preferred embodiment, the drag element comprises a small parachute stowed within the tubular king post. The activation mechanism comprises an expulsion device such as a spring loaded position within the king post and a deployment device such as a parachute opening spring. The parachute is attached to the hang glider by a line extending down to the bottom of the king post, but since the line is laterally confined by the small opening at the top of the king post, the effective point of attachment is at the top of the king post.

10 Claims, 10 Drawing Figures

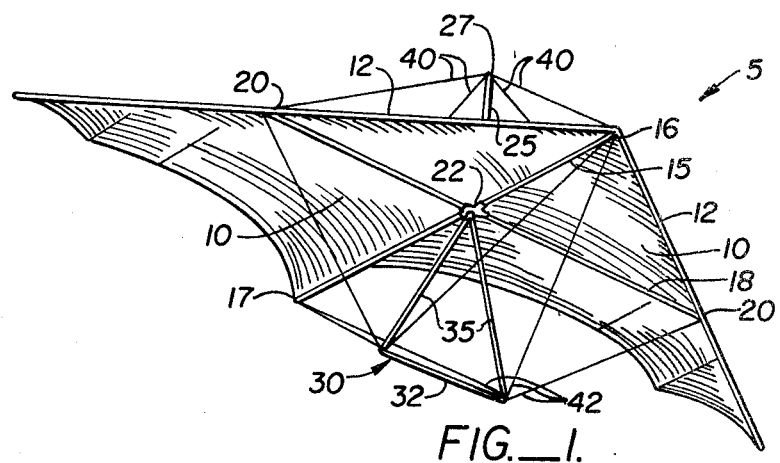
FIG._1.
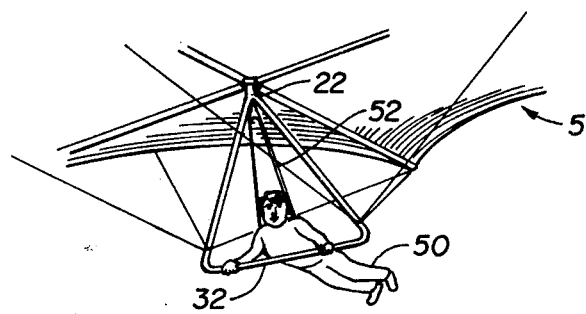
FIG._2.
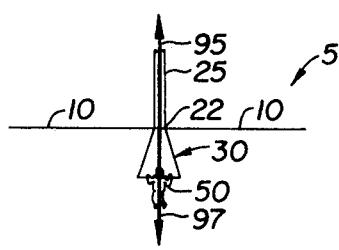
FIG._5a.
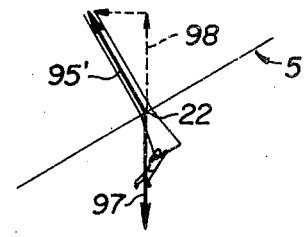
FIG._5b.
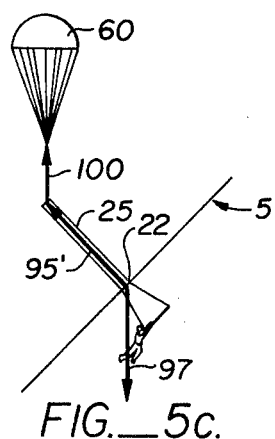
FIG._5c.

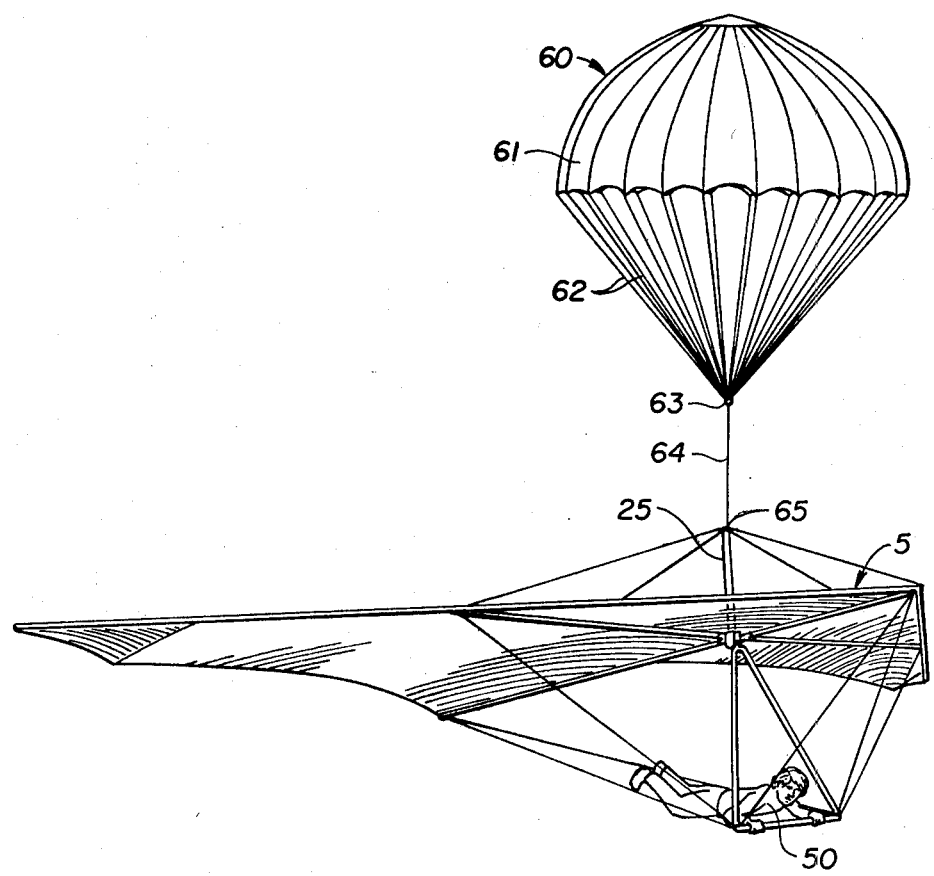
FIG._3.

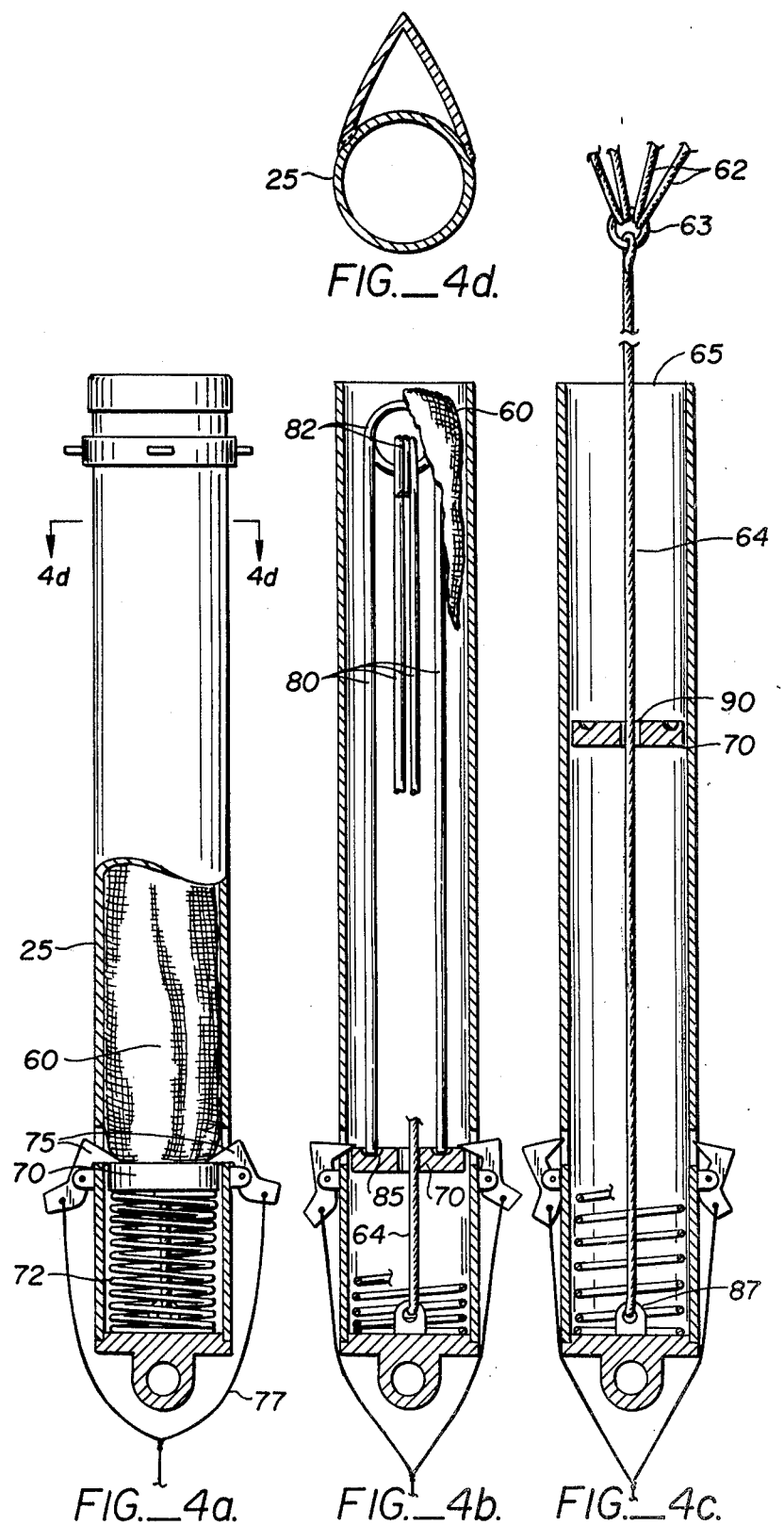

ATTITUDE RECOVERY DEVICE FOR HANG GLIDER

FIELD OF THE INVENTION

This invention relates generally to safety devices for hang gliders, and more specifically to a device for stabilizing an out of attitude hang glider.

BACKGROUND OF THE INVENTION

The relatively recent upsurge in the popularity of hang gliding as a leisure activity has brought into sharper focus the need for certain safety appliances. A major problem in low altitude flying is a loss of attitude wherein the hang glider, hereinafter sometimes referred to merely as a glider, rolls excessively. Such excessive roll results in a loss of lift, and, unless corrected within a very short time, may cause the glider to crash. The most common type of hang glider employs a rigidly attached triangular control bar with respect to which the pilot, himself suspended in a harness, shifts his weight to achieve the desired attitude. Thus roll control may be achieved by the pilot's shifting his weight transversely along the horizontal portion of the control bar to produce a moment about the roll axis. However, in a severely out of attitude glider, the horizontal portion of the control bar is at a sufficiently large angle from true horizontal that the pilot is required to provide a substantial vertical weight shift in order to right the glider. The relatively large correction required may be beyond the capability of a panic stricken novice flyer or even beyond that of a seasoned hang gliding enthusiast.

It is known to provide a hang glider pilot with a parachute to enable him to recover from various types of mishaps. Such parachutes are typically carried in a pack mounted to the chest of the pilot, and function in much the same way as conventional parachutes used for skydiving and the like. In those instances where the pilot assumes a supine position, suspended in a hammock-like harness, the parachute container may be sewn to the harness. Since the most common type of hang glider relies on structural members including a vertical tubular king post extending well above the wings, parachute deployment must not occur until the parachute has had a chance to clear the upper structural members. Thus while such parachutes would have utility in allowing a pilot to recover in case of structural failure at relatively high altitudes, they have little or no effectiveness in stabilizing an out of control glider at low altitude.

Although these dangers have been accepted as somewhat inevitable, as the sport of hang gliding attracts increasing numbers of people the need for a suitable attitude recovery device becomes more acute with each passing day. Such a device should be capable of extremely rapid activation with a minimum of action by the pilot.

SUMMARY OF THE INVENTION

The present invention provides a hang glider attitude recovery device that may be rapidly deployed with a minimum of pilot action. Operation occurs substantially free of problems of interference with the upper structural members of the hang glider, and the device may be readily retrofitted to existing gliders.

In broad terms, the present invention comprises drag means having an effective point of attachment rigidly spaced above the point from which the pilot is suspended, and means for activating the drag means at a point clear of upper structural members. The separation between the attachment point and suspension point provides a lever arm which is responsible for the operation of the device.

When the hang glider is in a position where the lever arm is inclined from the vertical (hang glider out of attitude), activation of the drag means provides an upward force at the upper end of the lever arm, which force produces a moment that tends to bring the suspension point back into a position under the attachment point. That is, the force tends to bring the out-of-attitude hang glider back into a stable, more nearly vertical flying position.

In the preferred embodiment, the drag means comprises a small parachute stowed within the tubular king post. The activation means comprises expulsion means such as a spring-loaded piston within the king post, and deployment means such as a parachute opening spring. The parachute is attached to the hang glider by a line extending down to the bottom of the king post, but since the line is laterally confined by the small opening at the top of the king post, the effective point of attachment is at the top of the king post.

The parachute opening spring comprises a plurality of arms that may be maintained in a configuration generally parallel to the axis of the king post but are coupled to spring portions near their tops that urge them to a position more generally perpendicular to the king post once the parachute is clear of the king post. This provides rapid, automatic, and positive deployment of the parachute as soon as possible after its having exited the king post. The parachute opening spring serves the additional function of keeping the parachute from assuming a bunched-up condition which could have the effect of hampering the rapid deployment once out of the king post, and further could cause fouling within the king post during the expulsion.

The spring-loaded piston generally serves the function of propelling the parachute and parachute opening spring out of the king post and away from the other structural portions of the hang glider to avoid fouling. This allows the parachute to be deployed without fouling the upper structural members, and further places the parachute above the dead air space directly over the wing to maximize effectiveness.

Activation may be effected by any suitable releasable latching means for maintaining the expulsion piston in a retracted position. While a mechanical latch and ripcord would provide a suitable mechanism, it is also possible to use a radio controlled latch mechanism for use in test or training situations.

For a further understanding of the nature and advantages of the present invention, reference should be had to the remaining portions of the specification and to the attached drawings.

BRIEF DESCRIPTION OF THE DRAWINGS

FIG. 1 is a perspective view showing the general components of a standard hang glider;

FIG. 2 is a perspective view of the pilot suspension system of the hang glider;

FIG. 3 is a perspective view of the hang glider after the parachute has been deployed;

FIGS. 4a–4c are vertical partially cutaway elevational views of the king post showing the parachute expulsion and deployment mechanisms;

FIG. 4d is a sectional view along line 4d—4d of FIG. 4a; and

FIGS. 5a–5c are schematic front elevational views showing the operation of the present invention in providing a righting moment to control and restore attitude.

DETAILED DESCRIPTION OF THE INVENTION

FIG. 1 shows the overall construction of a standard hang glider incorporating what is known as a "Rogallo wing." Glider 5 generally comprises a frame of lightweight tubular structural members over which is stretched a sheet of fabric material. These components define paired wing sections 10, having respective leading edges 12, symmetrically disposed about a longitudinal keel 15. Leading edges 12 are joined at their forward ends to keel 15 by a nose plate 16. Keel 15 extends rearwardly from nose plate 16 and terminates at a point 17. A cross bar 18 extends transversely with respect to keel 15, and has ends that meet leading edges 12 at respective intermediate points 20. Keel 15 and cross bar 18 come together at a central location 22. A king post 25 extends upwardly from location 22 and has an upper end 27 above the wing. A generally triangular control bar 30 comprises a horizontal control bar portion 32 and paired downwardly and outwardly extending control bar portions 35.

The aforementioned components are maintained in a rigid configuration with respect to each other by a plurality of guy wires. In particular, four upper wires 40, sometimes designated landing wires, extend from upper end 27 of king post 25 to respective anchor points at nose plate 16, keel point 17, and leading edge intermediate points 20. Three lower guy wires 42, sometimes designated flying wires, extend from each outer end of horizontal control bar 32 to respective anchor points at nose plate 16, rear keel point 17, and intermediate leading edge point 20.

FIG. 2 shows a typical mechanism for supporting a pilot 50. Pilot 50 is supported in a sling-type harness 52 which is supported from a point substantially proximate central point 22. In the configuration illustrated, pilot 50 is a supine position, but it is also common for harness 52 to have a configuration to allow pilot 50 to sit. In either case, pilot 50 maintains control of glider 5 by holding on to horizontal control bar portion 32 and shifting his weight transversely with respect to glider 5 (i.e. along bar 32) or longitudinally with respect to glider 5 (i.e. toward and away from horizontal control bar portion 32).

As shown in FIG. 3, the attitude recovery device of the present invention preferably comprises a parachute 60 which is deployed from within king post 25. Parachute 60 comprises a canopy 61, a plurality of shrouds 62 connected to canopy 61 and coming together at a common point of attachment 63, and an attachment cord 64 from the common point of attachment to glider 5. In order that parachute 60 provide the drag force necessary to effect stabilization, it must be deployed at a sufficient elevation above the wing that it is clear of the dead air space above the wing. Thus, canopy should be approximately 12 feet above wing sections 10 when deployed.

FIGS. 4a, 4b and 4c illustrate various aspects of the parachute stowage configuration within king post 25 and the expulsion and deployment mechanisms. As can be seen in FIG. 4a, parachute 60 is stored within the hollow cylindrical volume of king post 25 in a generally cylindrical elongate condition. Beneath folded parachute 60 is a loosely fitting piston 70 and a compression spring 72. Releaseable latches 75 maintain piston 70 at a position generally near the bottom of king post 25, in which position compression spring 72 is in a compressed condition. A ripcord mechanism 77 coupled to releaseable latches 75 allows the pilot to move latches 75 into a position where upward movement of piston 70 is not impeded. Thus, activation of ripcord mechanism 77 allows compression spring 72 to urge piston 70 upward, thereby expelling parachute 60 from within king post 25.

Referring to FIG. 4b, a deployment mechanism for parachute 60 may be seen. Parachute 60 is draped over a plurality of movable arms 80 which are maintained generally parallel to the axis of king post 25 while within king post 25. Arms 80 are connected at their upper ends to spring elements 82 which tend to urge arms 80 into an angular relationship with respect to their common axis. Outward movement of arms 80 is inhibited by suitable depressions 85 which engage the ends of arms 80 remote from opening spring elements 82. Additionally, outward opening is inhibited by parachute 60 which is draped over arms 80 and contained within king post 25. However, once piston 70 has reached the end of its travel proximate the top of king post 25, and once the draped parachute is no longer confined within king post 25, arms 80 are urged outwardly by springs 82 in order to deploy parachute 60. It should be noted that arms 80, in addition to opening parachute 60, serve the important function of keeping parachute 60 in its elongate draped condition which facilitates rapid deployment and avoids problems of jamming due to excessive friction between parachute 60 and the inner wall of king post 25.

As can be seen in FIG. 4c, parachute attachment cord 64, coupled at its upper end to parachute shrouds 62, is anchored at its end remote from shrouds 62 to a suitable anchor point 87 proximate the bottom of king post 25. Parachute attachment cord 64 passes through a central aperture 90 in piston 70. Therefore, lateral movement of cord 62 with respect to king post 25 is inhibited by the diameter of king post 25, and further by the diameter of aperture 90 within piston 70. Thus, parachute 60 is effectively coupled to glider 5 at the upper end of king post 25 despite the actual connection at the lower end.

As a practical matter, parachute 60 should be relatively small in order that it fit within king post 25. Thus parachute 60 will typically have an area in the range of one-eighth to one-quarter the wing area of glider 5. Even then, king post 25 may have to be made with larger diameter than normal in order to accommodate parachute 60 and the associated expulsion and deployment mechanisms. In order to counteract the increased drag due to the larger king post, king post 25 may be provided with an air foil shape as shown in FIG. 4d.

FIGS. 5a through 5c illustrate in schematic form the operation of the present invention. These figures are schematic illustrations looking along the direction of the roll axis. FIG. 5a shows a glider in horizontal attitude with respect to the roll axis. Pilot 50 is suspended beneath suspension point 22 while king post 25 extends upwardly therefrom. Aerodynamic forces on wing sections 10 provide a resultant aerodynamic force vector 95 while the weight of glider 5 and pilot 50 combined produce a net downward gravitational force vector 97.

The action of force vectors 95 and 97 occur at point 22, so that no moments about the roll axis are present.

FIG. 5b shows glider 5 in a condition of excessive roll. Such a condition may occur for any one of a number of reasons, including an excessive transverse weight shift by pilot 50, uneven gusts of wind, and the like. Assuming the pilot to be suspended beneath suspension point 22, force vectors 95 and 97 still acts through suspension point 22. However, the aerodynamic force vector, designated 95', is no longer vertical, but has a vertical component 98 that is reduced relative to the magnitude of force vector 95'. Accordingly, a loss of lift occurs, which at low altitudes may cause a crash before the pilot can get the glider in proper attitude.

FIG. 5c shows the action of parachute 60 after it has been deployed from king post 25. Parachute 60 provides an upward force vector 100 which, due to the effective mounting point of parachute 60 to the upper end of king post 25, acts through the upper end of king post 25. This vector force has two effects. First, the normally expected effect is that the additional upward force counteracts downward gravitational force 97 and to some extent compensates for the decreased vertical component of aerodynamic force vector 95'. However, due to the desire to store parachute 60 within the relatively small confine of king post 25, parachute 60 is a relatively small parachute. Accordingly, this force is generally of insufficient magnitude to prevent the loss of altitude so long as glider 5 remains in its excessively rolled position. However, force vector 100 has the important and surprising effect of providing a moment about suspension point 22 in order to right glider 5. In particular, it can be seen that king post 25 provides a lever arm, the horizontal component of which provides the righting moment. Therefore, as glider 5 loses altitude and is subjected to the drag force of parachute 60, the righting moment tends to bring king post 25 into a more vertical orientation so that the aerodynamic force vector is more nearly vertical and therefore counteracts the downward vertical gravitational force 97.

In summary, it can be seen that the present invention provides a simple mechanism for stabilizing an out of attitude hang glider so that it may be safely brought to ground. While the description is in terms of roll stabilization, the invention also provides pitch stabilization. The mechanism remains out of the way until it is needed, at which time it is rapidly and conveniently activated. While the above provides a full and complete disclosure and description of the preferred embodiment, various modifications, alternate constructions, and equivalents may be employed without departing from the true spirit and scope of the invention. For example, while the preferred drag means is a parachute, a rapidly inflatible balloon would provide similar results. Additionally, while a mechanically released latch mechanism was described, it would also be possible to employ a radio controlled release. Similarly, while a mechanical spring is shown as the preferred expulsion means, a small explosive charge could be used. Therefore, the above description and illustration should not be construed as limiting the scope of the invention, which is defined by the appended claims.

I claim:

1. A device for stabilizing an out-of-attitude hang glider in which a pilot is supported beneath a point of suspension comprising:
   drag means having a first non-operative configuration and a second operative configuration;
   activating means for causing said drag means to assume said second operative configuration; and
   spaced attachment means for providing an effective point of attachment of said drag means to said hang glider at a distance rigidly spaced away from said point of suspension along an axis normally extending above said point of suspension, said space attachment means permitting said drag means to oppose movement of said point of attachment generally independently of the angle between said axis and the direction of said movement, such that an upward force exerted by said drag means acting at said spaced point of attachment in cooperation with a downward gravitational force acting at said suspension point provides a righting moment about said point of suspension tending to bring said point of attachment into a position more closely in vertical alignment with said point of suspension.

2. The invention of claim 1 wherein said drag means comprises a parachute.

3. The invention of claim 1 wherein said hang glider is of the type having a vertical tubular king post extending upwardly from said suspension point and wherein said spaced attachment means is in part defined by said king post and further comprises means connecting said drag means through an upper open end of said king post to said hang glider.

4. The invention of claim 1 wherein said activating means comprises expulsion means for positively projecting said drag means upwardly away from said hang glider, and deployment means for causing said drag means to assume said second operative configuration after being projected by said expulsion means.

5. The invention of claim 4 wherein said drag means comprises a parachute, and wherein said deployment means comprises a plurality of arms movable from a first position generally parallel to a common axis to a second position at an angle with respect to said axis, and means for urging said arms from said first position to said second position to effect rapid deployment of said parachute.

6. The invention of claim 5 wherein said parachute has an effective area in the range of one-eighth to one-quarter the wing area of said hang glider.

7. The invention of claim 4 wherein said hang glider is of the type having a vertical tubular king post, wherein said drag means is stored within said king post, and wherein said expulsion means comprises:
   spring means within said king post;
   means coupled to said drag means and to said spring means; and
   releasable latch means maintaining said coupling means in a position wherein said spring is maintained in a compressed condition such that release of said latch means causes rapid expulsion of said drag means from said king post to a position clear of structural members on said hang glider.

8. A device for stabilizing an out of attitude hang glider of the type having a vertical tubular king post extending upwardly from a suspension point comprising:
   drag means having a first non-operative configuration sized to fit within said king post, and a second operative configuration outside said king post;
   expulsion means for propelling said drag means in said first non-operative configuration out of said king post;

deployment means for causing said drag means to assume said second operative configuration after being propelled out of said king post by said expulsion means; and attachment means connecting said drag means to said hang glider through the upper end of said king post to provide a point of attachment of said drag means to said glider at a distance rigidly spaced above said point of suspension by said king post height, said attachment means permitting said drag means to provide drag opposing movement of the upper end of said king post generally independently of the angle between said king post and the direction of said movement, such that an upward force exerted by said drag means acting at the upper end of said king post cooperates with a downward gravitational force acting at said suspension point to provide a righting moment about said suspension point which tends to bring said king post into a more nearly vertical orientation.

9. The invention of claim 8 wherein said drag means comprises a parachute, wherein said deployment means comprises a plurality of movable arms and arm opening spring means for urging said movable arms from a position generally parallel to a common axis to a position at an angle with respect to said common axis to effect rapid deployment of said parachute, and wherein said expulsion means comprises a spring-loaded piston within said king post.

10. The invention of claim 9 wherein said parachute has an effective area between approximately one-eighth and approximately one-quarter of the wing area of said hang glider.

* * * * *